(12) United States Patent
Hamed et al.

(10) Patent No.: US 11,306,163 B2
(45) Date of Patent: Apr. 19, 2022

(54) CHROMIUM OXIDE CATALYST FOR ETHYLENE POLYMERIZATION

(71) Applicant: SABIC Global Technologies B.V., Bergen op Zoom (NL)

(72) Inventors: Orass M. Hamed, Riyadh (SA); Vugar O. Aliyev, Riyadh (SA); Moosa Husain Al-Harthe, Riyadh (SA)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 465 days.

(21) Appl. No.: 16/476,896

(22) PCT Filed: Jan. 10, 2018

(86) PCT No.: PCT/EP2018/050506
§ 371 (c)(1),
(2) Date: Jul. 10, 2019

(87) PCT Pub. No.: WO2018/130539
PCT Pub. Date: Jul. 19, 2018

(65) Prior Publication Data
US 2021/0284762 A1    Sep. 16, 2021

Related U.S. Application Data

(60) Provisional application No. 62/490,778, filed on Apr. 27, 2017.

(30) Foreign Application Priority Data

Jan. 11, 2017 (EP) .................................... 17150931

(51) Int. Cl.
C08F 4/69 (2006.01)
B60K 15/03 (2006.01)
C07F 5/06 (2006.01)
C08F 2/34 (2006.01)
C08F 10/02 (2006.01)

(52) U.S. Cl.
CPC .......... *C08F 4/69* (2013.01); *B60K 15/03177* (2013.01); *C07F 5/066* (2013.01); *C08F 2/34* (2013.01); *C08F 10/02* (2013.01); *B60K 2015/03493* (2013.01); *C08F 2410/06* (2021.01)

(58) Field of Classification Search
None
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,588,790 A | 5/1986 | Jenkins, III et al. |
| 4,882,400 A | 11/1989 | Dumain et al. |
| 5,352,749 A | 10/1994 | Dechellis et al. |
| 5,541,270 A | 7/1996 | Chinh et al. |
| 5,895,770 A | 4/1999 | Pullukat et al. |
| 7,122,607 B2 | 10/2006 | Hagerty et al. |
| 7,300,987 B2 | 11/2007 | Hagerty et al. |
| 7,504,463 B2 | 3/2009 | Cann et al. |
| 2013/0310526 A1 | 11/2013 | Jorgensen |
| 2013/0337210 A1* | 12/2013 | Aliyev ............... C08F 2/34 428/36.92 |
| 2014/0024789 A1 | 1/2014 | Ker et al. |

FOREIGN PATENT DOCUMENTS

| | | |
|---|---|---|
| EP | 1162210 A1 | 12/2001 |
| WO | 9940131 A1 | 8/1999 |
| WO | 2010115614 A1 | 10/2010 |
| WO | 2013186025 A1 | 12/2013 |
| WO | 2014206816 A1 | 12/2014 |
| WO | 2015078816 A1 | 6/2015 |

OTHER PUBLICATIONS

Cann et al. "Comparisoin of Silyl Chromate and Chromium Oxide Based Olefin Polymerization Catalysts" Macromol. Symp. 2004, 213, pp. 29-36.
Gregg, S.J. et al. "Adsorption, Surface area and porosity", Academic Press, London, 1982, 313 pages.
International Search Report dated Apr. 25, 2018; International Application No. PCT/EP2018/050506; International Filing Date Jan. 10, 2018 (7 pages).
Lowell, J. "Introduction to Powder Surface Area", J.Wiley & Sons, 1979.
McDaniel "Supported Chromium Catalysts for Ethylene Polymerization"; Advances in Catalysis; vol. 33; 1985; pp. 47-98.
Peacock, Andrew "Handbook of Polyethylene, Structures, Properties, and Applications", Marcel Dekker, Inc., NY, NY, pp. 61-64 (2000).
Pullukat, T. J. "A Chemical Study of Thermally Activated Chromic Titanate on Silica Ethylene Polymerization Catalysts", Journal of Polymer Science, Polymer Chemisty Edition, vol. 18, 2857-2866 (1980).
Written Opinion dated Apr. 25, 2018; International Application No. PCT/EP2018/050506; International Filing Date Jan. 10, 2018 (4 pages).

* cited by examiner

*Primary Examiner* — Fred M Teskin
(74) *Attorney, Agent, or Firm* — Cantor Colburn LLP

(57) ABSTRACT

The invention relates to a solid catalyst system comprising a chromium compound, a metal compound, an aluminium compound and a silicon oxide support, wherein the silicon oxide support has an average particle diameter in the range between ≥20 and ≤50 μm, a pore volume in the range between ≥1.7 ml/g and ≤3 ml/g, and a surface area in the range between ≥400 m²/g and ≤800 m²/g, and wherein the aluminium alkoxide compound has the formula $R_1$—Al—$OR_2$ wherein $R_1$ is selected from ($C_1$-$C_8$) alkyl groups and $OR_2$ is selected from ($C_1$-$C_8$) alkoxyl groups.

11 Claims, No Drawings

CHROMIUM OXIDE CATALYST FOR ETHYLENE POLYMERIZATION

CROSS REFERENCE TO RELATED APPLICATIONS

This application is a National Stage application of PCT/EP2018/050506, filed Jan. 10, 2018, which claims the benefit of U.S. Provisional Application No. 62/490,778, filed Apr. 27, 2017, and European Application No. 17150931.8, filed Jan. 11, 2017, all of which are incorporated herein in their entireties by reference.

BACKGROUND

This invention relates to a supported chromium oxide catalyst system for the production of polyethylene in fluidized bed gas phase reactors.

The polymerisation of ethylene using supported chromium based catalysts are disclosed for example by Kevin Cann in "Comparison of silyl chromate and chromium oxide based olefin polymerisation catalysts" (*Macromolecular Symp*, 2004, 213, 29-36).

The chromium oxide based catalyst, which is commonly referred to in the literature as "the Phillips catalyst", can be obtained by calcining a chromium compound carried on an inorganic oxide carrier in a non-reducing atmosphere (mainly dry air required). A number of modifications has been done to the chromium oxide catalyst system by the addition of different types of modifiers to enhance the molecular weight and molecular weight distribution, like the addition of titanium and aluminium compounds to the chromium oxide systems. The chromium oxide catalysis and the ethylene polymerisation with this specific catalyst are disclosed in "Handbook of Polyethylene" by Andrew Peacock at pages 61-64. The nature of the silica support, the chromium loading, and the activation method can all influence the chemical state of the supported chromium and performance of the chromium oxide on silica (silicon oxide) catalyst in the polymerization process. For example, the activity of the catalysts generally increases with an increase in the activation temperature, while the molar mass of the polymerization product may decrease or the HLMI (High Load Melt Index) may increase. The influence of the activation conditions on the catalyst properties is disclosed in Advances in Catalysis, Mc Daniel, Vol. 33, 48-98, 1985. Generally, the activation takes place at an elevated temperature, for example, at a temperature above 450° C., preferably from 450 to 850° C. The activation may take place in different atmosphere, for example in dry air. Generally, the activation takes place at least partially under an inert atmosphere preferably consisting of nitrogen. The activation time after reaching the maximum temperature may last for several minutes to several hours. This activation time is at least 1 hour but it may be advantageous to activate much longer.

Pullukat et al. (Journal of Polymer Science; Polymer chemistry Edition; vol 18, 2857-2866; 1980) discloses thermally activated ethylene polymerisation catalysts which contain chromium and titanium on silica.

A disadvantage of ethylene polymerisation catalysts which contain chromium, titanium and/or an aluminium alkyl on silica (silicon oxide support) is the fact that they are not capable of producing polyethylene (PE) with an increased resin bulk density values during the polymerisation of ethylene in a gas phase reactor process and with a high productivity.

Producing resin fluff (the resin produced by the reactor as polymer powder before compounding) with reduced resin bulk density has a negative impact on the gas phase reactor's bed weight, causing a reduction in the drop size of the reactor and hence lowering the production rate for the same number of reactor drops.

Also, reduced resin bulk density has a negative impact on the upper and lower fluidized bulk density inside the reactor, which forces operation to reduce the superficial gas velocity (SGV) of the reactor to avoid resin carry over, which causes distributor plate and cooler fouling. It is also well known that running at reduced SGV reduces the momentum flux inside the reactor's bed, causing poor conversion, hence reducing the production rate. Add to that, running at low SGV, reduces the capacity of heat removal.

BRIEF DESCRIPTION

An object of the present invention is to provide an improved silica supported chromium oxide catalyst used for the polymerisation of ethylene in fluidized bed gas phase process, which results in HDPE resin of high resin bulk density, resulting in an increased bed weight and increased upper and lower fluidized bulk density, leading to an increase in the drop size of the reactor and increasing the production rate. Another object of the present invention is to provide an improved silica supported chromium oxide catalyst with a high productivity.

The object is obtained by a solid catalyst system comprising a chromium compound, a metal compound, an aluminium compound and a silicon oxide support, wherein the silicon oxide support has an average particle diameter in the range between ≥20 and ≤50 μm, a pore volume in the range between ≥1.7 ml/g and ≤3 ml/g, and a surface area in the range between ≥400 m2/g and ≤800 m²/g and wherein the aluminium alkoxide compound has the formula

$$R_1\text{—Al—}OR_2$$

wherein $R_1$ is selected from ($C_1$-$C_8$) alkyl groups and $OR_2$ is selected from ($C_1$-$C_8$) alkoxyl groups.

DETAILED DESCRIPTION

According to a preferred embodiment of the invention the pore radius of the silicon dioxide support is at least 100 Angstrom. The upper limit is 200 Angstrom.

According to a preferred embodiment of the invention the silica support has an average particle diameter in the range between ≥30 and ≤40 μm, a pore volume in the range between ≥1.7 ml/g and ≤1.9 ml/g and a surface area in the range between ≥500 m²/g and ≤600 m²/g.

The surface area and pore volume of the supports are determined by the BET nitrogen adsorption method. Test Method: ASTM D 1993-03 (2013) Standard Test Method for Precipitated Silica-Surface Area by Multipoint BET Nitrogen Adsorption. See also references "Adsorption, Surface Area and Porosity" by S. J. Gregg and K. S. W. Sing, Academic Press, London (1982) and "Introduction to Powder Surface Area" by S. Lowell, J. Wiley & Sons, New York, N.Y., (1979). The average particle size is determined via ASTM D-1921 12.

The chromium compound may be selected from various organic and inorganic forms of chromium.

Preferably, the chromium compound is selected from chromium acetate, chromium acetyl acetonate, chromium acetate hydroxide and chromium trioxide.

Most preferably the chromium compound is chromium acetate or chromium acetyl acetonate.

Preferably, the amount of chromium in the catalyst is between 0.2% by weight and 0.9% by weight. Preferably the loading is between 0.23 by weight and 0.30% by weight.

Examples of suitable metal compound or metal halide transition metal compound which acts as a modifier and used for the synthesis of the solid catalyst component according to the invention may be represented by formulas $T_m(OR^1)_nX_{4-n}$ and $T_m(R^2)_nX_{4-n}$, wherein $T_m$ represents a transition metal of Group IVB, VB, or VIB, $R^1$ and $R^2$ represent an ($C_1$-$C_{20}$) alkyl group, ($C_1$-$C_{20}$) aryl group or ($C_1$-$C_{20}$) cycloalkyl group, X represents a halogen atom, preferably chlorine and n represents a number satisfying $0 \leq n \leq 4$.

The metal alkoxy compound may be also represented in the general formula $Ti(OR)_aX_b$ wherein R represents a hydrocarbon residue having 1 to 20 carbon atoms, M is a metal more preferably a transition metal, X represent a halogen atom and a and b represent number satisfying $1 \leq a \leq 4$, $0 \leq b \leq 3$ and a+b=4 in the case of a tetravalance metal.

Preferably the metal is selected from titanium, vanadium, hafnium and zirconium.

Most preferably the metal is titanium.

According to a preferred embodiment of the invention the titanium compound is a compound according to the formulas $Ti(OR^1)_nX_{4-n}$ and $Ti(R^2)_nX_{4-n}$, wherein $R^1$ and $R^2$ represent an ($C_1$-$C_{20}$) alkyl group, ($C_1$-$C_{20}$) aryl group or ($C_1$-$C_{20}$) cycloalkyl group, X represents a halogen atom, preferably chlorine, and n represents a number satisfying $0 \leq n \leq 4$.

Examples of suitable titanium compounds include titanium alkoxy compounds for example tetraethoxy titanium, tetramethoxy titanium, tetrabutoxy titanium, tetrapropoxy titanium, tetraisobutoxy titanium, tetrapentoxy titanium, triethoxychloro titanium, diethoxydichloro titanium, trichloroethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride.

Preferably titanium tetraisopropoxide is applied.

The weight ratio Cr:Ti may range for example between 1:2 and 1:4.

The titanium content of the catalyst may range between 0.1 and 10% by weight, preferably in the range between 0.1 and 6% by weight.

Other suitable metal compounds include for example vanadium trichloride, vanadium tetrachloride, vanadium oxytrichloride and zirconium tetrachloride.

Preferably the aluminium compound is an aluminium alkoxide compound with the formula

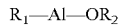

wherein $R_1$ is selected from ($C_1$-$C_7$) alkyl groups and $OR_2$ is selected from ($C_1$-$C_8$) alkoxyl groups, in which $R_2$ groups can be the same or different as the $R_1$ groups.

Examples of suitable aluminum alkoxide compounds include diethyl aluminium ethoxide, dihexyl aluminium ethoxide, dioctyl aluminium ethoxide and/or dihexyl aluminium propoxide.

According to a preferred embodiment of the invention the aluminium alkoxide compound is diethyl aluminium ethoxide.

With reference to the amounts in general for each 0.01 Mole Cr, 0.08 Mole of Ti and 0.05 Mole of Al are required.

This solid catalyst system is applied in a gas phase polymerisation process to produce high density ethylene polymer.

The catalyst according to the invention produces polyethylene of increased resin bulk density in gas phase process with increased mechanical properties for example ESCR, FNCT and Izod values.

The chromium catalyst according to the invention increases the space-time yield (STY) of any given gas phase reactor by about 25%.

Furthermore, the increase in the upper and lower fluidized bulk density will give more room to increase the superficial gas velocity (S.G.V) which will also allow higher conversion rate resulting in higher production rate along with enhanced heat removal.

The catalyst according to the invention is useful for the production of homo and copolymers.

In case of the production of an ethylene copolymer the alpha olefin co monomer may be selected from propylene, 1-butene, 1-pentene, 4-methyl-1-pentene, 1-hexene and/or 1-octene.

Preferably the commoner is 1-hexene.

The polyethylene obtained with the catalyst according to the invention in gas phase polymerization has high-load melt index (HLMI 21.6 kg)$\geq$0.1 g/10 min and $\leq$30 g/10 min (according to ISO 1133)

$M_w/M_n \geq 10$ and $\leq 18$ (according to size exclusion chromatography (SEC) measurement)

density $\geq 930$ kg/m$^3$ and $\leq 970$ kg/m$^3$ (according to ISO1183) and resin bulk density $\geq 450$ and $\leq 530$ kg/m$^3$ (according to ASTM D-1895)

The silica supported chromium oxide catalyst system according to the invention is capable of producing relatively low HLMI values for example in the range between 1 and 12 ($MI_{21.6\,kg}$) for large blow molding articles of desired ESCR values still at increased bed temperature of no less than 105° C.

The gas phase reactor may be any reactor suitable for gas phase polymerizations and may e.g. be vertically, horizontally mechanically agitated reactor or a fluidized bed reactor.

According to a preferred embodiment of the invention the reactor is a fluidized bed reactor.

In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomers flowing through the bed. Unreacted monomers and other optional gaseous components exit the fluidized bed and are contacted with a cooling system to remove this heat. The cooled gas stream, including monomer, comonomer and optional for example condensable liquids, is then re-circulated through the polymerization zone. Simultaneously, polymer product is withdrawn from the reactor. The reactor temperature in a gas phase process may range between for example 30° C. and 130° C. A description of a gas phase process is disclosed in for example U.S. Pat. Nos. 4,543,399 and 4,588,790.

Suitable fluidized bed reactors include for example a bubbling fluidized bed reactor, a circulating fluidized bed reactor, an annular fluidized bed reactor, a multi-zone fluidized bed reactor and a flash reactor. With 'fluidized bed' is meant that an amount of solid particles (in this case preferably the solid catalyst and/or the solid catalyst to which the monomer is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid. An example of a process using a fluidized bed for producing polyolefins is disclosed in U.S. Pat. No. 4,882,400. Other examples of processes using a fluidized bed for producing polyolefins are described in, for example, U.S. Pat. Nos. 3,709,853; 4,003,712; 4,011,382; 4,302,566; 4,543,399; 4,882,400; 5,352,749; 5,541,270; 7,122,607, and 7,300,987.

The bottom of a fluidized bed reactor may comprise an inlet connected to a feeder for the reaction composition such as ethylene, nitrogen, hydrogen and comonomer.

The middle zone in the reactor above the distribution plate comprises an inlet for the polymerization catalyst that can be fed to the reactor in combination with nitrogen. The middle zone of the reactor also comprises an outlet to the product discharge tank. The top zone of the reactor comprises an outlet for a top recycle stream, wherein the outlet for the top recycle stream is connected to an inlet of the compressor. The compressor comprises an outlet for compressed fluids and the outlet of the compressor is connected to an inlet for compressed fluids of the cooling unit. The cooling unit comprises an outlet for providing a bottom recycle stream, which outlet of the cooling unit is connected to the inlet at the bottom of the reactor.

A suitable example of a multi-zone fluidized bed reactor (FBR) system is a multi-zone reactor operable in condensed mode, which multi-zone reactor comprises a first zone, a second zone, a third zone, a fourth zone and a distribution plate, wherein the first zone is separated from the second zone by the distribution plate, wherein the multi-zone reactor is extended in the vertical direction wherein the second zone of the multi-zone reactor is located above the first zone and wherein the third zone of the multi-zone reactor is located above the second zone, and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor wherein the largest diameter of the inner wall of the third zone is larger than the largest diameter of the inner wall of the second zone. This FBR can operate in a so-called "condensing mode" or "condensed mode" which is effective for removal of the heat produced during the exothermic polymerization. In this mode, heat removal is achieved by cooling the gaseous recycle stream to a temperature below its dew point, resulting in the condensation of at least a part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor and enables feeding of one or more very highly active catalysts. Details of an FBR which operates in a condensing mode are described for example in EP-A-13195141.

Ethylene compositions comprising the ethylene polymers obtained with the process according to the invention may also comprise additives for example lubricants, fillers, stabilisers, antioxidants, compatibilizers and pigments. The additives used to stabilize the polymers may be, for example, additive packages including hindered phenols, phosphites, UV stabilisers, antistatics and stearates.

The invention also relates to blow molded articles produced with the polyethylene according to the present invention.

According to a preferred embodiment of the invention the polymer obtained with the process according to the invention is applied in the production of fuel tanks.

The ethylene polymers may also be extruded or blow-moulded into articles such as for example pipes, bottles, IBC containers, tight head and open head drums and wire and cable applications.

The invention will be elucidated by averages of the following non-limiting examples.

EXAMPLES

The properties of the polymers produced in the Examples were determined as follows:

The high load melt index (HLMI) is determined using the procedures of ASTM D-1238 10 Condition F using a load of 21.6 kg at a temperature of 190° C.

Density was measured according to ASTM D-792 08.

Bulk density was measured according to ASTM D-1895.

Polymer molecular weight and its distribution (MWD) were determined by Polymer Labs 220 gel permeation chromatograph (GPC). The chromatograms were run at 150° C. using 1,2,4-trichlorobenzene as the solvent with a flow rate of 0.9 ml/min. A refractive index detector is used to collect the signal for molecular weights. The software used is Cirrus from Polyab for molecular weights from GPC. The calibration of the HT-GPC uses a Hamielec type calibration with broad standard and fresh calibration with each sample set.

$M_z$ and $M_{z+1}$ are higher average molecular weights (according to ASTM D-6474 12)

$M_w$: weight-average molecular weight (according to ASTM D-6474 12)

$M_n$: number-average molecular weight (according to ASTM D-6474 12)

MWD (molecular weight distribution) is the ratio of weight-average molecular weight ($M_w$) to number-average molecular weight ($M_n$), (according to ASTM D-6474 12)

Catalyst Synthesis

To a three-necked round bottom flask, equipped with a condenser and a mechanical stirrer 200 g of dried silicon oxide support at 200° C. is placed into the flask then 4.7 g of chromium acetate hydroxide were added to the silica then slurried in 250 cm$^3$ of methanol (100%), which was stirred at 80° C. for 30 minutes. After which, drying the methanol solvent took place at 95° C. with nitrogen purge. The dried chromium on silica powder was cooled down to room temperature then slurried with 250 cm$^3$ of iso-pentane, followed by the addition of 41 cm$^3$ of tetraethoxy titanium Ti(OC$_2$H$_5$)$_4$ (100%). The contents were mixed at 65° C. for another 10 minutes then drying the solvent at 95° C. with nitrogen purge.

For chromium catalyst activation the dried catalyst powder was placed in a calciner and the following sequence was followed:

Ramp from ambient to 400° C. in under N$_2$ flow then hold for 20 minutes

At 400° C. switch from N$_2$ to Air flow

Ramp from 400° C. to 800° C. under dry Air

Hold at 777° C. for 4 hours under Dry Air

Cool to room temperature then switch to N$_2$ purge.

The dried chrome-titanium on silica powder was cooled down to room temperature then slurried with 250 cm³ of Iso-pentane, followed by the addition of 17 cm³ of diethyl aluminium ethoxide $(C_2H_5)_2Al$—$OC_2H_5$ (98%). The contents were mixed at 45° C. for another 10 minutes then drying the solvent at 85° C. with nitrogen purge.

TABLE 1

Overview of prepared catalyst systems.

|   |   | Cat Inv. Ex I | Cat Comp. Ex. A | Cat Comp. Ex. B* | Cat Comp. Ex. C | Cat Comp. Ex. D | Cat Comp. Ex. E |
|---|---|---|---|---|---|---|---|
| Silicon oxide support (silica) | | | | | | | |
| surface area | m²/g | 550 | 310 | 555 | 525 | 525 | 625 |
| pore volume | ml/g | 1.8 | 1.50 | 1.8 | 1.55 | 3 | 3 |
| average particle diameter | μm | 33 | 48 | 33 | 49 | 75 | 75 |
| Elemental analysis of catalyst system | | | | | | | |
| Cr | wt % | 0.6 | 0.6 | 0.57% | 0.55% | 0.57% | 0.57% |
| Ti | wt % | 3.8 | 3.9 | 3% | 2.7% | 2.5% | 2.5% |
| Al | wt % | 1.55 | 1.51 | 1.47% | 1.48% | 1.5% | 1.5% |

*Instead of diethyl aluminium ethoxide $(C_2H_5)_2Al$—$OC_2H_5$ (98%) TEAL was used in the preparation of the catalyst
Inv. Ex. = Inventive examples,
Comp. Ex. = Comparative examples Instead of diethyl aluminium ethoxide $(C_2H_5)_2Al$—$OC_2H_5$ (98%), TEAL was used in the preparation of the sample Cat Comp. Ex. B.

Ethylene Copolymerization

An autoclave with a volume of 2 liters was purged with nitrogen at 130° C. for 30 minutes. After cooling the autoclave to 70° C., one liter of iso-pentane was introduced to the reactor+10 ml of 1-hexene, then the reactor was pressurized with 15 bar ethylene. Then 0.1 mmol of TEAL was injected into the reactor by the averages of a catalyst injection pump.

This was followed by injection of 0.2 g of catalyst according to Table 1 after being slurried in 20 cm³ of Iso-pentane solvent. The reactor temperature was raised to 101° C. Ethylene polymerization was carried out for 60 minutes; with ethylene supplied on demand to maintain the total reactor pressure at 20 bar.

TABLE 2

Properties of PE—Results from Slurry bench scale reactor. For polymerisation the corresponding catalyst systems of Table 1 were used.

| | Sample | | | | | |
|---|---|---|---|---|---|---|
| | Inv. Ex I | Comp. Ex. A | Comp. Ex. B | Comp. Ex. C | Comp. Ex. D | Comp. Ex. E |
| Catalyst system | | | | | | |
| | Cat Inv. Ex I | Cat Comp. Ex. A | Cat Comp. Ex. B | Cat Comp. Ex. C | Cat Comp. Ex. D | Cat Comp. Ex. E |
| catalyst productivity g PE/g cat h at 200 psig | 4,560 | 2,135 | 933 | 3,870 | 3,760 | 4,100 |
| $M_w$ | 411,194 | 455,355 | 266,554 | 320,355 | 412,656 | 393,357 |
| $M_z$ | 2,688,431 | 2,631,020 | 2,121,323 | 1,878,326 | 1,967,723 | 2,221,456 |
| $M_n$ | 14,277 | 17,145 | 17,876 | 18,279 | 15,878 | 16,899 |
| MWD | 28 | 26.5 | 14 | 17.5 | 25 | 23 |
| Density kg/m³ | 950 | 951 | 949 | 949 | 947 | 946 |
| Resin Bulk density kg/m³ | 431 | 301 | 465 | 398 | 342 | 351 |
| Fines level % | 0.2 | 1.6 | 0.4 | 1.5 | 0.5 | 0.53 |

As one can see from Table 2. The Inventive example Inv. Ex I yields in an excellent resin bulk density while at the same time the catalyst productivity is high in comparison to the comparative examples Comp. Ex. A to E.

TABLE 3

Mechanical properties of the PE resins.

| | | Inv. Ex I | Comp. Ex. A | Comp. Ex. B |
|---|---|---|---|---|
| Izod Impact (@ −30° C.) kJ/m² | ISO 180/A | 20 | 17 | 18 |
| Charpy Impact (@ −40° C.) kJ/m² | ISO 179 | 17 | 13 | 13 |
| ESCR (Hours) bent strip | ASTM D 1693 | 700 | 487 | 510 |
| FNCT (Hours) | ISO 16770 | 50 | 41 | 53 |

The inventive Ex. I resulted in a resin well suited as fuel tank grade. The resin properties are much better compared to the samples Comp. Ex. A and Comp. Ex. B.

The data with reference to the catalyst according to the comparative example A and the example according to the invention I applied in the Fluidized Bed gas phase polymerizations are summarized in Table 4.

TABLE 4

Gas phase polymerization—conditions and resin properties.

| Sample Catalyst | Inv. Ex I-G Cat Inv. Ex I | Comp. Ex. A-G Cat Comp. Ex. A |
|---|---|---|
| Bed Temp | 106° C. | 103° C. |
| ΔT | 4.9° C. | 4.3° C. |
| Total reactor pressure | 20.6 | 20.7 |

TABLE 4-continued

Gas phase polymerization—conditions and resin properties.

| Sample<br>Catalyst | Inv. Ex I-G<br>Cat Inv. Ex I | Comp. Ex. A-G<br>Cat Comp. Ex. A |
|---|---|---|
| Ethylene partial pressure | 15.4 bar | 15.4 bar |
| $C_6/C_2$ molar ratio | 0.0037 | 0.004 |
| $H_2/C_2$ | 0.015 | 0.014 |
| Fluidized bulk density | 380 kg/m$^3$ | 220 kg/m$^3$ |
| Superficial gas velocity | 0.44 m/sec | 0.42 m/sec |
| Resin Bulk Density | 477 kg/m$^3$ | 318 kg/m$^3$ |
| Ash | <100 ppm | 110 ppm |
| Density | 945 kg/m$^3$ | 945 kg/m$^3$ |
| HLMI | 6.8 | 6.7 |
| Average particle size | 0.53 mm | 0.55 mm |
| Fines | 0.2% | 1.8% |

Space Time Yield Calculations:

Defined as production per unit volume:
STY=Production Rate (lb/h)/Volume (ft)$^3$ The residence time according to the comparative example:

Residence time=Bed Weight/Production Rate

Residence Time=93 kg/(40 kg/h)=2.35 hour

With the present invention the bed weight increased to 118 kg

To maintain the same residence time of 2.35, production rate was increased to 51 kg/h Residence time with the present invention: 118 kg/51 kg/h=2.32

Space-Time Yield with the comparative catalyst=40 kg (88 lb)/6.8 ft$^3$=12.9

Space-Time Yield with the catalyst according to the invention=51 kg (112.2 lb)/6.8 ft$^3$=16.5

This results in an increase of the Space-Time Yield of 27.9%

As one can see from Table 4, the Inv. Ex I-G shows a much higher resin bulk density than Comp. Ex. A-G. In addition, the Inv. Ex I-G shows a much higher yield compared to Comp. Ex. A-G.

The invention claimed is:

1. Solid catalyst system comprising a chromium compound, a metal compound, an aluminum compound and a silicon oxide support,
wherein the silicon oxide support has an average particle diameter in the range between ≥20 and ≤50 μm, a pore volume in the range between ≥1.7 ml/g and ≤3 ml/g, and a surface area in the range between ≥400 m$^2$/g and ≤800 m$^2$/g and
wherein the aluminum compound has the formula R1-Al—OR2 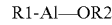

wherein R1 is selected from (C1-C8) alkyl groups and OR2 is selected from (C1-C8) alkoxyl groups.

2. Catalyst system according to claim 1 wherein the silicon oxide support has an average particle diameter in the range between ≥30 and ≤40 μm, a pore volume in the range between ≥1.7 ml/g and ≤1.9 ml/g, and a surface area in the range between ≥500 m$^2$/g and ≤600 m$^2$/g.

3. Catalyst system according to claim 1 wherein the chromium compound is selected from chromium trioxide, chromium acetonyl acetonate, chromium acetate and/or chromium acetate hydroxide.

4. Catalyst system according to claim 1, wherein the metal compound is a compound represented by formulas Tm(OR$^1$)$_n$X$_{4-n}$, a compound represented by formula Tm(R$^2$)$_n$X$_{4-n}$, or a combination thereof, wherein Tm represents a transition metal of Group IVB, VB, or VIB, R$^1$ and R$^2$ represent an (C$_1$-C$_{20}$) alkyl group, (C$_1$-C$_{20}$) aryl group or (C$_1$-C$_{20}$) cycloalkyl group, X represents a halogen atom, and n represents a number satisfying 0≤n≤4.

5. Catalyst system according to claim 1 wherein the metal is selected from titanium, vanadium, hafnium and zirconium.

6. Catalyst system according to claim 5 wherein the metal is titanium.

7. Catalyst system according to claim 6 wherein the titanium compound is a compound according to the formulas Ti (OR$_1$)$_n$X$_{4-n}$ a compound according to the formula Ti (R$^2$)$_n$X$_{4-n}$, or a combination thereof, wherein
R$^1$ and R$^2$ represent an (C$_1$-C$_{20}$) alkyl group, (C$_1$-C$_{20}$) aryl group or (C$_1$-C$_{20}$) cycloalkyl group,
X represents a halogen atom, and
n represents a number satisfying 0≤n≤4.

8. Catalyst system according to claim 1 wherein R1 and the R2 of the aluminum compound according to the formula R1-Al—OR2 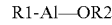

can be the same or different.

9. Catalyst system according to claim 1, wherein the aluminum compound is selected from diethyl aluminum ethoxide, dihexyl aluminum ethoxide, dioctyl aluminum ethoxide and/or dihexyl aluminum propoxide.

10. Catalyst system according to claim 9, wherein the aluminum compound is diethyl aluminum ethoxide.

11. An ethylene gas phase polymerisation process wherein the catalyst is a catalyst according to claim 1.

* * * * *